(12) United States Patent
Bright-Thomas et al.

(10) Patent No.: US 10,218,979 B2
(45) Date of Patent: Feb. 26, 2019

(54) ENTROPY CODING STATE SEGMENTATION AND RETENTION

(71) Applicant: Cisco Technology, Inc., San Jose, CA (US)

(72) Inventors: Paul G. Bright-Thomas, Wokingham (GB); Thomas Davies, Guildford (GB)

(73) Assignee: Cisco Technology, Inc., San Jose, CA (US)

( * ) Notice: Subject to any disclaimer, the term of this patent is extended or adjusted under 35 U.S.C. 154(b) by 88 days.

(21) Appl. No.: 15/340,342

(22) Filed: Nov. 1, 2016

(65) Prior Publication Data

US 2018/0124407 A1 May 3, 2018

(51) Int. Cl.
*H04N 19/13* (2014.01)
*H04N 19/172* (2014.01)
*H04N 19/126* (2014.01)
*H04N 19/56* (2014.01)
*H04N 19/137* (2014.01)

(52) U.S. Cl.
CPC ........... *H04N 19/13* (2014.11); *H04N 19/137* (2014.11); *H04N 19/172* (2014.11)

(58) Field of Classification Search
None
See application file for complete search history.

(56) References Cited

U.S. PATENT DOCUMENTS

| | | | | |
|---|---|---|---|---|
| 5,764,804 A * | 6/1998 | Yajima | ................ | G06T 9/004 |
| | | | | 348/27 |
| 5,793,314 A * | 8/1998 | Auyeung | ............. | H04N 19/176 |
| | | | | 341/51 |
| 8,774,273 B2 * | 7/2014 | Valente | ................ | H04N 19/70 |
| | | | | 375/240.12 |
| 8,861,598 B2 | 10/2014 | Mauchly et al. | | |
| 9,208,534 B2 * | 12/2015 | Cain | ................... | G06T 1/0092 |
| 2011/0194737 A1 * | 8/2011 | Sharma | ................ | G06K 9/00 |
| | | | | 382/112 |
| 2012/0082218 A1 * | 4/2012 | Misra | ................... | H04N 19/197 |
| | | | | 375/240.12 |
| 2012/0159194 A1 * | 6/2012 | Anderson | ............ | H04L 9/002 |
| | | | | 713/190 |

(Continued)

OTHER PUBLICATIONS

D. Mukherjee, Ph.D., et al., "A Technical Overview of VP9—the Latest Open-source Video Codec", SMPTE Meeting Presentation, SMPTE 2013 1569806163, written for presentation at the SMPTE 2013 Annual Technical Conference & Exhibition, SMPTE Motion Imaging Journal, vol. 124, Issue: 1, Jan. 2015, 17 pages.

(Continued)

*Primary Examiner* — Mohammad J Rahman
(74) *Attorney, Agent, or Firm* — Edell, Shapiro & Finnan, LLC (57) ABSTRACT

Video coding and decoding techniques are provided in which entropy coding states are stored for regions of video frames of a sequence of video frames, upon completion of coding of those regions. Entropy coding initialization states for regions of a current video frame are derived based on entropy coding states of corresponding regions of a prior video frame in the sequence of video frames. This process may be performed at a video encoder and a video decoder, though some signaling may be sent from the encoder to the decoder to direct the decoder is certain operations.

20 Claims, 10 Drawing Sheets

(56) References Cited

U.S. PATENT DOCUMENTS

| | | | | |
|---|---|---|---|---|
| 2013/0114691 A1* | 5/2013 | Guo | .................... | H03M 7/4018 |
| | | | | 375/240.03 |
| 2014/0105293 A1* | 4/2014 | George | ............... | H03M 7/3071 |
| | | | | 375/240.12 |
| 2014/0140396 A1 | 5/2014 | Wang et al. | | |
| 2014/0294071 A1* | 10/2014 | Robert | ................ | H03M 7/4037 |
| | | | | 375/240.08 |
| 2014/0307808 A1* | 10/2014 | Kudryashov | ........ | H04N 19/463 |
| | | | | 375/240.27 |
| 2015/0124874 A1 | 5/2015 | Pace et al. | | |
| 2015/0334405 A1 | 11/2015 | Rosewarne et al. | | |
| 2016/0057430 A1 | 2/2016 | Kolesnikov et al. | | |

OTHER PUBLICATIONS

J. Bankoski, et al., "VP8 Data Format and Decoding Guide", Independent Submission, ISSN: 2070-1721, Nov. 2011, RFC 6386, 304 pages.

A. Grange, et al., "VP9 Bitstream & Decoding Process Specification", Version 0.6, Mar. 31, 2016, Google, Inc., 171 pages.

* cited by examiner

ENTROPY CODING STATE SEGMENTATION AND RETENTION

TECHNICAL FIELD

The present disclosure relates to video coding and decoding.

BACKGROUND

Multiple video compression standards use entropy coding to efficiently express syntactic elements conveying the parameters of compression algorithms. Some of these models, e.g. context-adaptive binary arithmetic coding (CABAC) in H.264 and H.265, use adaptive models of the statistics of particular syntactic elements that evolve as successive values for each syntactic element are coded. At the start of coding a new coding region (picture, slice, tile) these models are typically initialized to a null state, and the statistical models in the encoder and the decoder are matched as they evolve.

Later video coding standards (e.g., H.265) can sub-divide a picture in two dimensions into coding regions called tiles, each coded independently of other tiles in the same picture. This enables encoding and decoding in parallel, for faster implementations, and also allows a two-dimensional (2D) sub-region to be more focused around video content within that region, than a one-dimensional (1D) subset of a raster scan of full picture width. In present schemes, the entropy model for a tile within a frame will begin at a common default and adapt as the coding within the tile proceeds.

DESCRIPTION OF EXAMPLE EMBODIMENTS

Overview

In one embodiment, video coding and decoding techniques are provided in which entropy coding states are stored for regions of video frames of a sequence of video frames, upon completion of coding of those regions. Entropy coding initialization states for regions of a current video frame are derived based on entropy coding states of corresponding regions of a prior video frame in the sequence of video frames. This process is performed at a video encoder and a video decoder, though some signaling may be sent from the encoder to the decoder to direct the decoder is certain operations.

DETAILED DESCRIPTION

Figure 1:
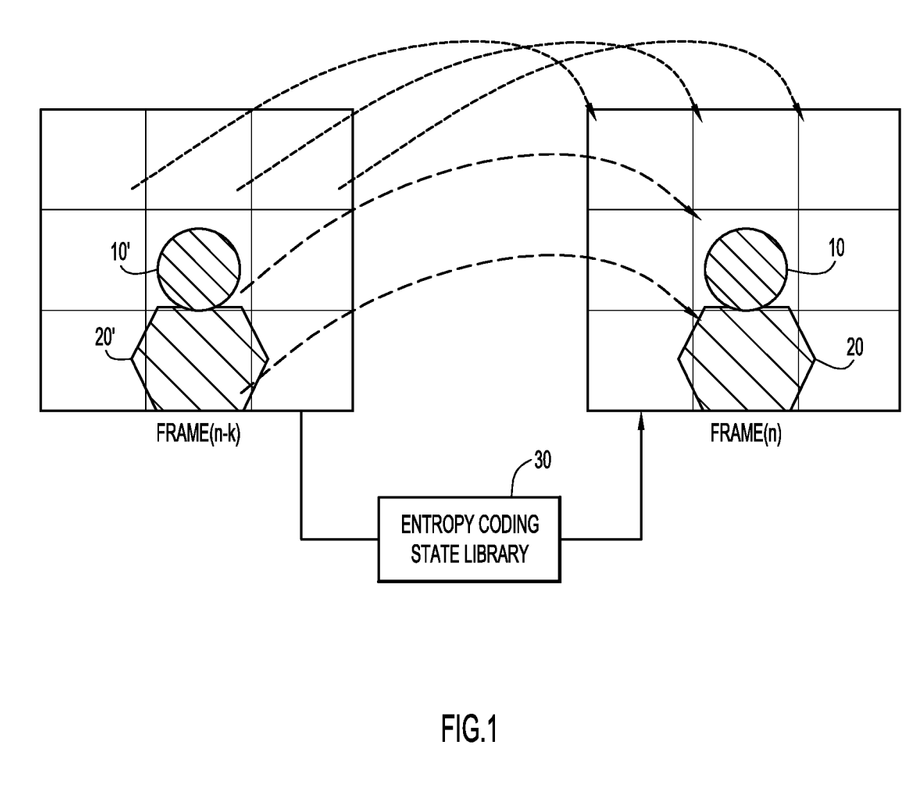
FIG. 1 is a diagram graphically depicting a method for retaining entropy coding state for regions of video frames in order to use entropy coding state for co-located regions in a current video frame, according to an example embodiment.

Reference is first made to FIG. 1. Presented herein are techniques for improving efficiency of adaptation in entropy coding for video compression, by retaining adaptation in past frames with similar content and coding parameters, and exploiting spatial segmentation of a coded frame (e.g. for parallelism and for error resilience), so that adaptation is at finer granularity than that of whole-frame entropy coding adaptation. Adaptive entropy coding state is retained for co-located regions. Spatial segmentation according to content allows for adaptation to be more specific to the properties of one type of content within a sub-region, and therefore more successful and efficient coding.

Entropy coding is the efficient expression of the parameters of the video tools used to compress each part of each picture (video frame) of a coded sequence, using codes which exploit the statistical distribution of coded values. The best entropy coding methods adapt to the content they have coded for, and this adaptation can be reset at the boundaries of sub-picture regions (slices, tiles etc.).

FIG. 1 shows a current video frame, Frame(n) and a prior video frame, Frame(n-k). Frame(n-k) may not be the immediately prior video frame to the current frame, Frame(n). In other words, k= or >1.

As depicted in FIG. 1, the state of entropy coding models associated with tiles or other picture coding regions (including content-defined regions such as "segments", which are an arbitrary subset of possibly non-adjacent blocks within a coded frame) is retained for past frames, and those models are used to achieve superior statistical modelling of entropy coding of corresponding tiles or regions in future frames. This process may be performed at an encoder and a decoder.

As an example, FIG. 1 shows first and second regions 10 and 20 of distinctive content, relative to background sub-regions, in current frame, Frame(n). The entropy coding states of the co-located regions 10' and 20' in a prior video frame, Frame(n-k) (where priority is in bitstream order, not necessarily in display order), are retained and used for entropy coding the first and second regions 10 and 20 of the current frame, Frame(n). This process is performed at both a video encoder and a video decoder, though some efficiencies can be exploited when the video encoder signals certain information to the video decoder, as described herein.

The state of entropy coding models associated with tiles or other picture coding regions (including content-defined regions such as "segments", which are an arbitrary subset of possibly non-adjacent blocks within a coded frame) is retained for past frames, and those models are used to achieve superior statistical modelling of entropy coding of corresponding tiles or regions in future pictures.

This allows, for example, for adaptation of entropy coding more slowly on stationary content and more rapidly on non-stationary content. When there are different content types in a frame, it is better to initialize them differently so that the entropy statistics are different for different regions.

To this end, an entropy coding state library 30 (e.g., initialization statistics) is retained for different regions of video frames over a sequence of video frames. Selections are made from the library of initialization statistics which are appropriate for a region of the current video frame (e.g., segment or a tile). The library may be viewed as a reference buffer that is updated over time across a sequence of video frames.

As an example, the entropy coding state statistics for frame N may not be the same as that of frame N−1. However, in most modern encoding methods, there are different frame types with different characteristics: intra coded or inter coded, quality level, prediction type (forward or bidirectional), or position within a Group of Pictures (GOP) hierarchy. Hence, rather than simply selecting frame N−1, a previous frame is selected that was coded with the same set of parameters (for example, high quality or low quality) and has the same position in the frame hierarchy.

Figure 2:
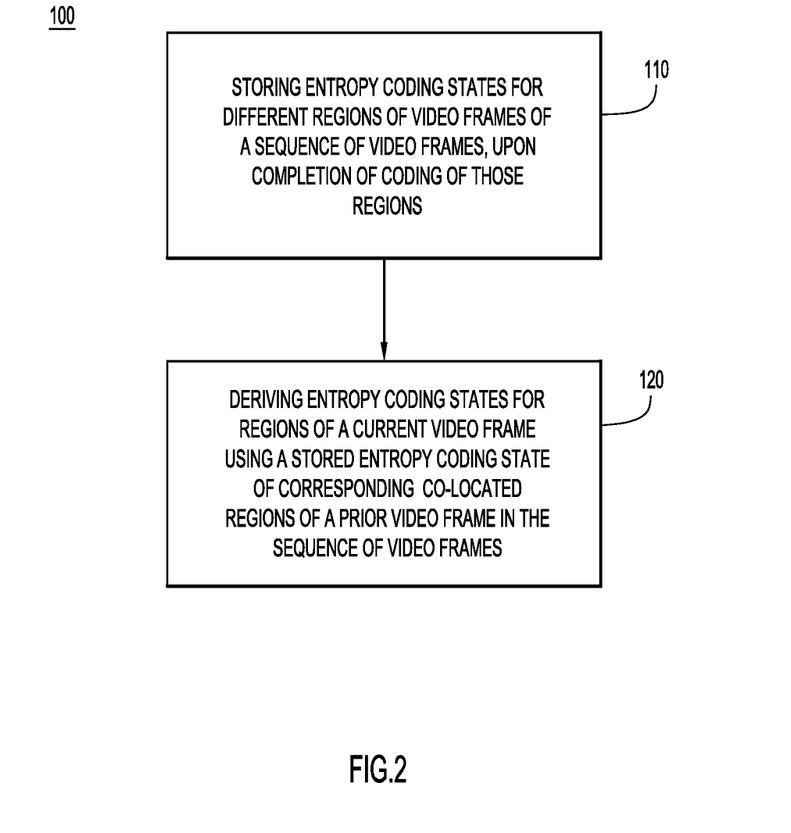
FIG. 2 is a flow chart generally depicting operations for a process to use retained entropy coding state of regions of a past video frame for co-located regions in a current video frame, according to an example embodiment.

Reference is now made to FIG. 2. FIG. 2 is a high-level flow chart of a method 100 pertaining to the techniques shown in FIG. 1. At 110, entropy coding states are stored/updated for different regions of video frames of a sequence of video frames, over time, upon completion of coding of those regions. Operation 110 is the creation and maintenance/updating of the library of entropy coding states. As described herein, individual regions may be defined in order to encompass a specific type of picture content so that regions of different types of picture content are treated differently when deriving entropy coding initialization states. At 120, entropy coding initialization states for regions of a current video frame are derived using stored entropy coding states of corresponding regions of a prior video frame in the sequence of video frames. The stored entropy coding states are updated for regions over time. As described below, deriving may involve selecting a prior video frame from which to use entropy coding state for deriving the entropy coding state of the current video frame.

In one example, at the encoder, when there are a priori reasons to believe a picture has similar properties to a previously coded picture (content similar and largely co-located, same picture type, same major coding parameters, like range of quantization parameter values used, etc.), then a set of statistics from a past frame is identified on that basis.

Likewise, at the decoder, operation 120 may involve obtaining an index or deriving an index for a given syntax element, and then looking up in the library using the index to obtain the initialization statistics for the given syntax element.

Further examples and variations are now described.

Where the past frame is a reference frame, this involves retention of entropy coding state associated with a reference picture, in addition to the retention of actual reference pixels. The coding region (e.g., tiling) structure may be static and independent of picture content, and where the picture content is relatively static, and the current video frame is coded in a similar way (slice type, target bitrate) to a past frame, the statistics of the entropy coding model for a co-located (or otherwise linked) region in past and present frames will be very similar. Therefore, there is an advantage to be had in statistical coding of a region in the current video frame if it evolves from the model established in the coding of the co-located (or otherwise related) region in the past picture.

Figure 3A:
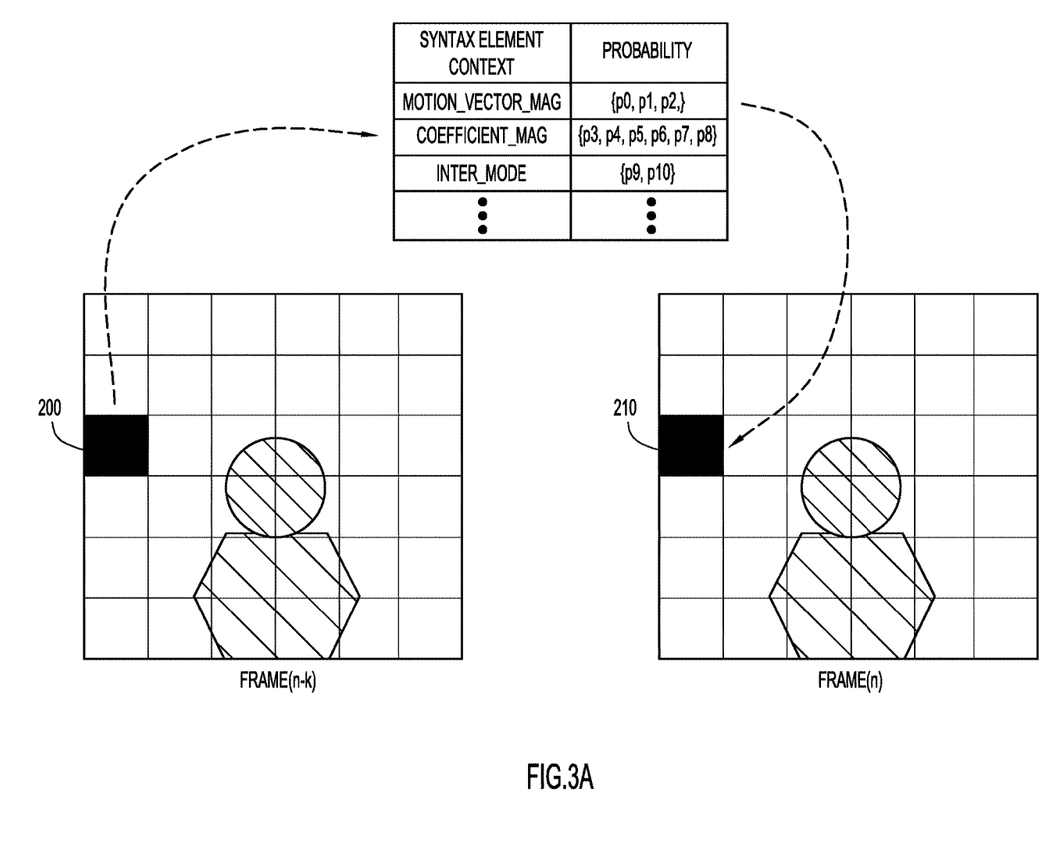
FIG. 3A shows an example of entropy coding state propagated from a co-located region in one frame to another frame, according to an example embodiment.
Figure 3B:
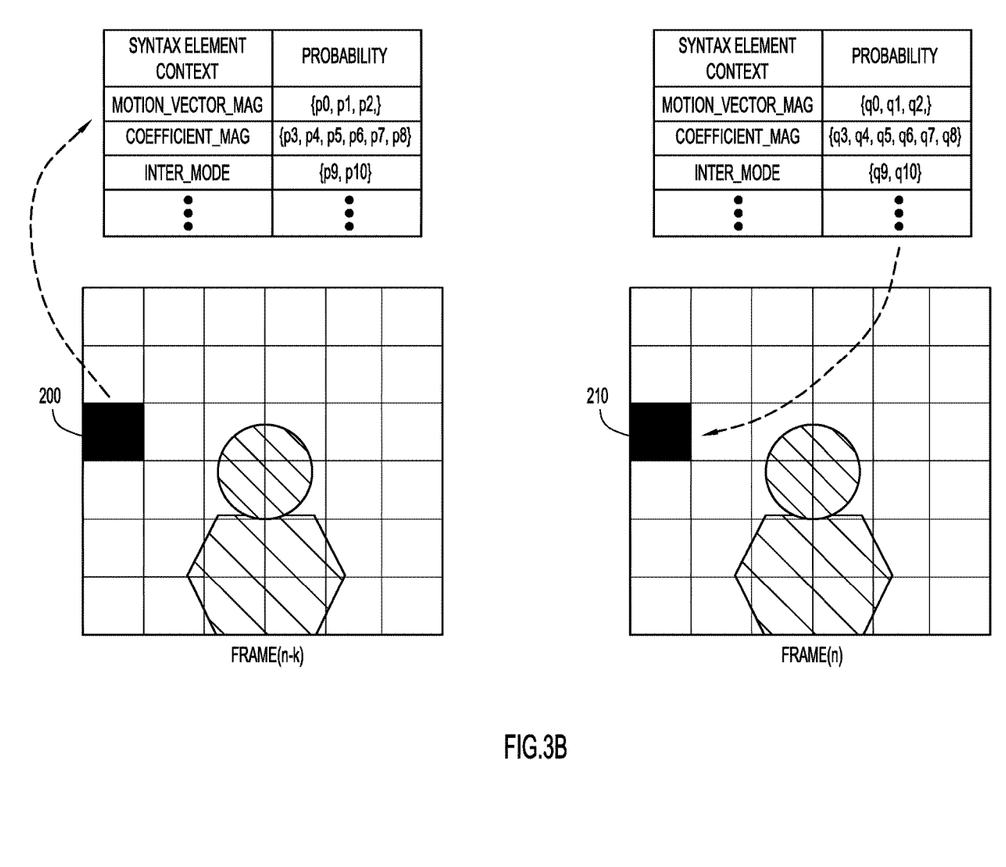
FIG. 3B is similar to FIG. 3B, but shows how entropy coding state may be modified when propagated from a co-located region of one frame to another frame, according to an example embodiment.

To this end, reference is now made to FIGS. 3A and 3B. These figures show examples of entropy coding state data that is propagated from a co-located region in one frame to another frame. Entropy coding data may consist of statistical contexts for motion, vector magnitudes, and coefficient magnitudes. Each context may consist of a numerical probability or probability distribution for values that may occur. The context may additionally include counts of different symbol values, or orderings of symbol values identifying, for example, the most probable symbol(s). A context may additionally include frequency counts of different symbol values. A context is applicable to coding a value based on conditions that may be determined by both encoder and decoder, for example the value of previously transmitted syntax elements. Syntax elements may be coded with more than one context, which is selected according to deterministic rules applicable both in the encoder and decoder.

FIG. 3A shows how this context data may be copied after coding or decoding one co-located region 200 in one frame, Frame(n−k), for use in coding or decoding the data associated with the co-located region 210 in a subsequently transmitted frame, Frame(n). A set of context data may be associated with a particular syntax element such as transform coefficient magnitude or motion vector magnitude. If the current video frame is coded differently to the related region in the prior video frame, e.g. by different quantization parameter, or as a non-reference "disposable" frame (similar past frames not retained at the decoder or encoder), then it may still be possible to adjust the entropy coding state from a past frame, to be appropriate, and better than a null model, for coding the sub-picture regions of the present frame. One method would be to predict probability values and code the differences. For example, a parameterized model of the state is obtained by coding a given kind of content at several values of the parameter and a function is derived from the variation of the model with respect to the parameter. An example is the quantization parameter, which tends to reduce the numerical value (by increasing a dividing step size) of the coefficients of frequency residuals. FIG. 3B shows how some of the context data may be modified before use in the corresponding co-located region. Modifications may include changing extreme values (probabilities very close to 0 or to 1), averaging with other similar sets of context probabilities from other related or similar regions, averaging with default probability values not transmitted but known to both encoder or decoder. This can be done selectively for individual contexts.

Figure 3C:
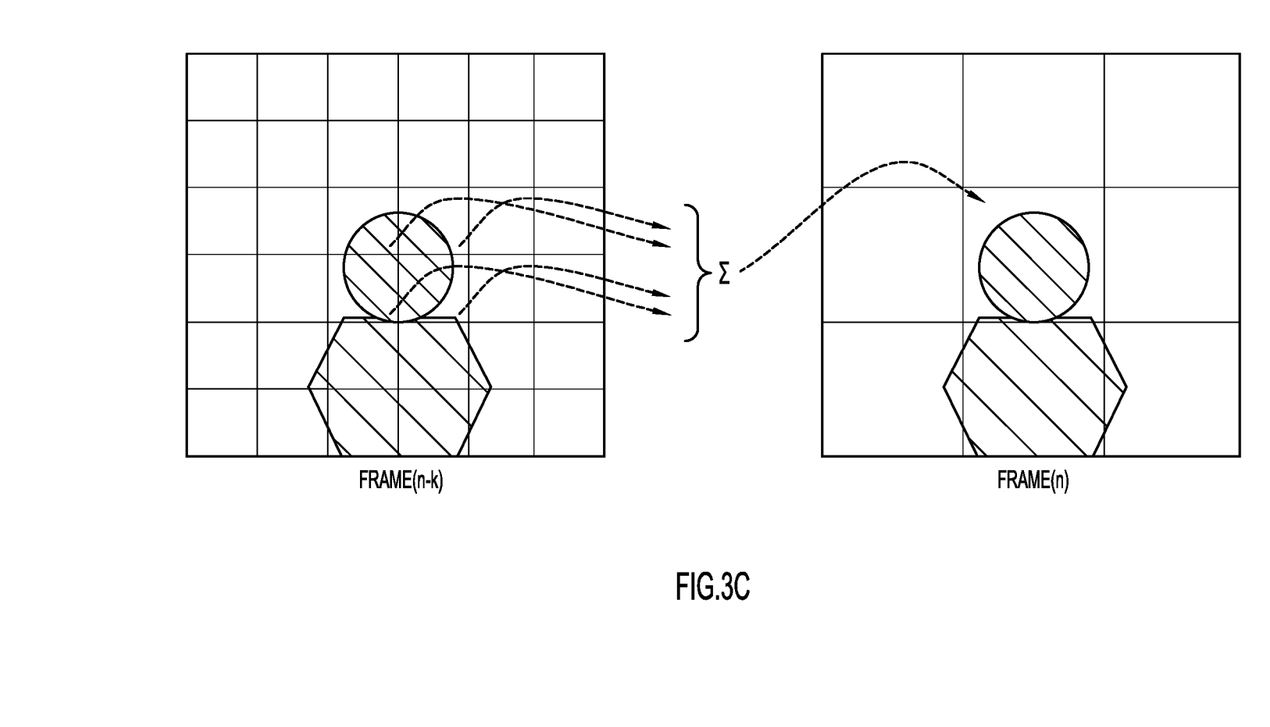
FIG. 3C shows an example of re-using entropy coding state from one arrangement of sub-frame regions in one frame to another arrangement of sub-frame regions in another frame, according to an example embodiment.

If the current video frame has a different segmentation (slices, tiles, segments) than that of an otherwise appropriate past video frame, then entropy coding states in the sub-picture regions of the past frame could be combined with weighting (for larger sub-divisions in the present picture) or mapped based on location (for smaller sub-divisions in the present picture). This is shown in FIG. 3C, where, when there is a change in frame sub-regions, adaptive entropy coding state is mapped to closest corresponding regions. In other words, when the current video frame has a different segmentation than that of a selected prior video frame, the aforementioned deriving operation includes combining, with weighting of regions of the selected prior video frame for larger regions in the current video frame, or mapping based on location for smaller regions in the current video frame. FIG. 3C shows the re-use of entropy coding state from one arrangement of sub-frame regions in Frame(n−k) to a different arrangement of sub-frame regions in frame(n). States can be assigned based on combinations of states in Frame(n−k), or by assignment of the state in Frame(n−k) co-located with the starting point of the sub-frame region to be coded in Frame(n).

Figure 3D:
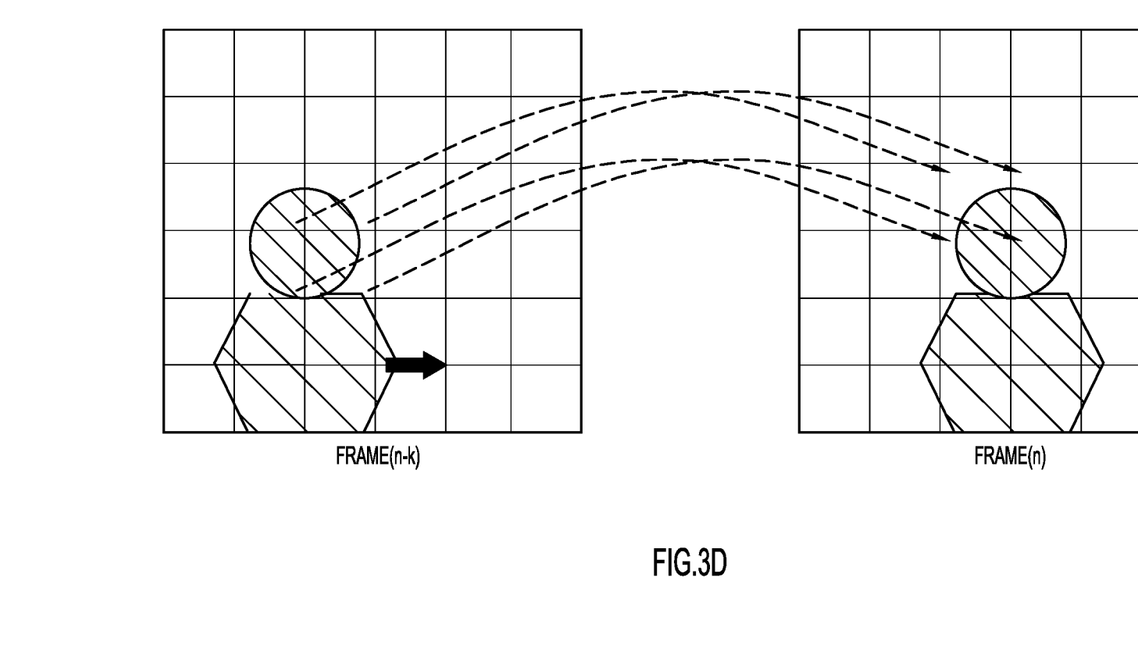
FIG. 3D shows an example of translating/migrating entropy coding state from one frame to another frame when motion has occurred.

If significant motion has occurred relative to the prior video frame that is appropriate to provide a statistical model, then statistical properties of sub-picture regions can be "migrated" from regions in the prior video frame, based on sub-picture motion (specifically signaled, or derived from motion field aggregation); the use of "migrated" state, as opposed to default co-located state, would be signaled in the bitstream. FIG. 3D shows that when there is motion of the content between frames, adaptive entropy coding state is migrated to corresponding regions of the frames. As an example, FIG. 3D shows a translation/migration of retained entropy coding state associated with foreground content regions from the location within the frame at which the foreground content was coded in Frame(n−k) to the location where it will be encoded in Frame(n). Thus, when motion has occurred in the current video frame relative to a selected prior video frame, the aforementioned deriving operation may involve translating entropy coding states from regions in the selected prior video frame based on sub-frame (region by region) motion information. The sub-frame motion information may be signaled by an encoder to a decoder. Deriving of entropy coding initialization states may be based only on contexts for a prior video frame upon which the current video frame depends for motion compensation purposes.

In these methods both, implicit selection could be used. That is, in one form, selecting may be implicit based on values of a set of quantization parameters used to code a video frame and position of a video frame in a frame hierarchy. In another form, selecting is implicit based on type of coded video frame and position within a group of pictures pattern of frame types, including any frame reference hierarchy. In another form, explicit signaling of one of a number of possible candidate video frames for re-using the prior states ("entropy model competition") may be used. That is, explicit signaling is made by an encoder to a decoder of one of a number of possible candidate prior video frames from which to use entropy coding states. Each region of the current video frame may be signaled by an encoder to a decoder with an independently selected prior video frame from which to use entropy coding states. Deriving of entropy coding in initialization states may be based on signaling, on a region basis from the encoder to the decoder, where the signaling indicates whether to derive entropy coding initialization states based on an entropy coding state of a corresponding region of a prior video frame or based on a default entropy coding model.

Entropy coding state is used for parsing, and therefore for error resilience purposes dependency chains from frame-to-frame need to be broken on occasion. An obvious point is at a keyframe, but for real-time communications it may be more frequent than that to allow for frames to be parsed in order to obtain motion vectors for use in error concealment.

This use of entropy coding states of prior frames may be a normative method to be used in encoding and decoding in some as-yet unissued video coding standard. No extensive transfer of information from encoder to decoder is involved to use this method, although an optional flag (for each region) to indicate that this method is in use, or alternately to revert to default model initialization, could be added. Which video frame to use for the provision of entropy coding models can be identified at the picture level (ideally in each independently coded unit, such as slice), and it will often be the case that a single past video frame provides an adequate set of statistical models for the sub-regions of the present picture (if the pictures are similar). As an elaboration, each sub-region could be signaled with a specific picture to provide the entropy state to be used if it would be advantageous to do so. This is somewhat analogous to the ability to choose pixel data from different reference frames to predict different regions within the same frame. However, the choice will not necessarily be correlated with that choice of reference picture. For example, if Frame(n) is a higher-layer frame of layer j referencing a base-layer Frame(n−k) from layer 0, then the best model of entropy coding state is likely to be an earlier frame from the same layer j (coded with the same tools and probably similar coded frame size), than the reference Frame(n−k) of which the pixel data is referenced.

Entropy coding statistics are necessarily reset by decoder refresh, but where bandwidth permits it would be possible to transmit the representation of an established entropy coding model in the parameter sets contained in a keyframe. Specifically, this pertains to the set of contexts that would be relevant to coding the intra prediction content of a keyframe. This is a natural consequence of using a model for a keyframe since the set of contexts for a keyframe is smaller than that for a typical frame (no motion vectors or reference indices, far fewer block types, etc.). This may be particularly appropriate to two-pass encoding, where a first pass could derive a set of entropy coding states for spatial sub-regions of a coded keyframe, used in both encode and decode of a second pass. Alternatively, to avoid multi-pass encoding, the entropy coding model used at a keyframe could be derived from, for example, past coded intra-macroblocks in prior frames, and transmitted at the head of a new keyframe.

Where video is transmitted over a lossy medium, for example some kinds of packet network communications, these techniques may involve the decoding of the current tile or slice depend upon previously transmitted data that has not been received. This may cause decoding to fail, and if there is a chain of such dependencies between frames, no further data may be decodable. The situation is similar to the loss of reference pictures for motion compensated prediction. An encoder may make sure that any loss of resilience is contained by a number of means. First, the encoder may ensure that the chains of entropy context dependencies are regularly broken by reverting to default initializations from time to time. Secondly, it may ensure that entropy context dependencies follow a similar pattern to motion compensation reference dependencies, so that if references have been successfully received then so have entropy coding context initialization states. Thirdly, the encoder may explicitly signal entropy coding dependencies in such a way that a decoder may detect that they have not been met.

Since Instantaneous Decoder Refresh allows only intra-prediction, only a subset of contexts in an entropy coding model is used, and furthermore a set of contexts could be differentially encoded relative to a base set, allowing for the efficient transmission of multiple context sets mapped to the tile structure of a keyframe. If this mechanism is not used, then all contexts, for all frame classes, would be reset to default at a keyframe.

Figure 3E:
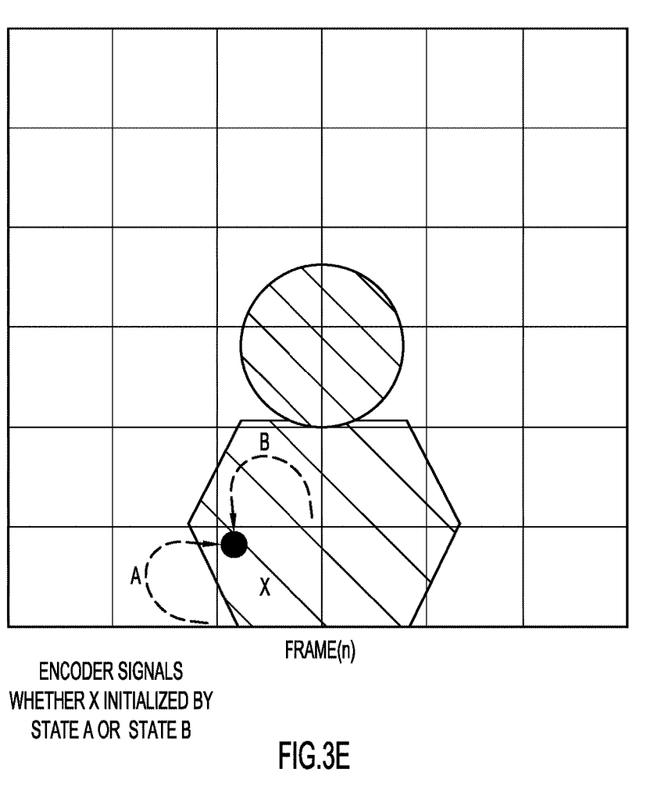
FIG. 3E is a diagram showing how the entropy coding state of spatial neighboring regions may be used for a region of a current video frame, according to an example embodiment.

The foregoing description is made with respect to temporal propagation of entropy coding state between regions of separate pictures, on the basis that several existing picture sub-division schemes are defined for independently decodable units (slices, tiles) and such that no information may be shared between such units within the same picture. However, where the spatial segmentation of a picture does permit spatial dependency, such as between blocks within a picture, between dependent tiles or slices, or between segments, then entropy coding state could be signaled as propagated from one of a set of spatial neighbors (or even non-adjacent neighbors within the same sub-picture segment defined by content), as an alternative to temporal propagation. That is, deriving of the entropy coding initialization states may be based on signaling from an encoder to a decoder as to a selection of one or more spatial neighbors or non-adjacent neighbors within a common segment of the current video frame from which to use entropy coding state. This is an extension over the default propagation of entropy coding state between successively coded regions, by signaling which of a set of spatially adjacent neighbors (not necessarily immediately preceding in coding order) is selected by the encoder to be used to provide the pre-initialized entropy coding state. Thus, as shown in FIG. 3E, entropy coding state can be propagated, from within a current video frame, from a set of spatial neighbors (adjacent or non-adjacent) to a given region of the frame. The encoder may signal to the decoder whether region X is initialized by state A or state B, in the example shown in FIG. 3E.

The entropy coding techniques presented herein are useful in connection with any form of progressively adaptive entropy coding, where the properties of the encoding are changed by the values previously coded, in a way that is specific to the content coded, and the advantage would be similarly achieved in using coding state that is appropriately adapted based on similar prior content, rather than frequent re-initialization to null state.

Figure 4:
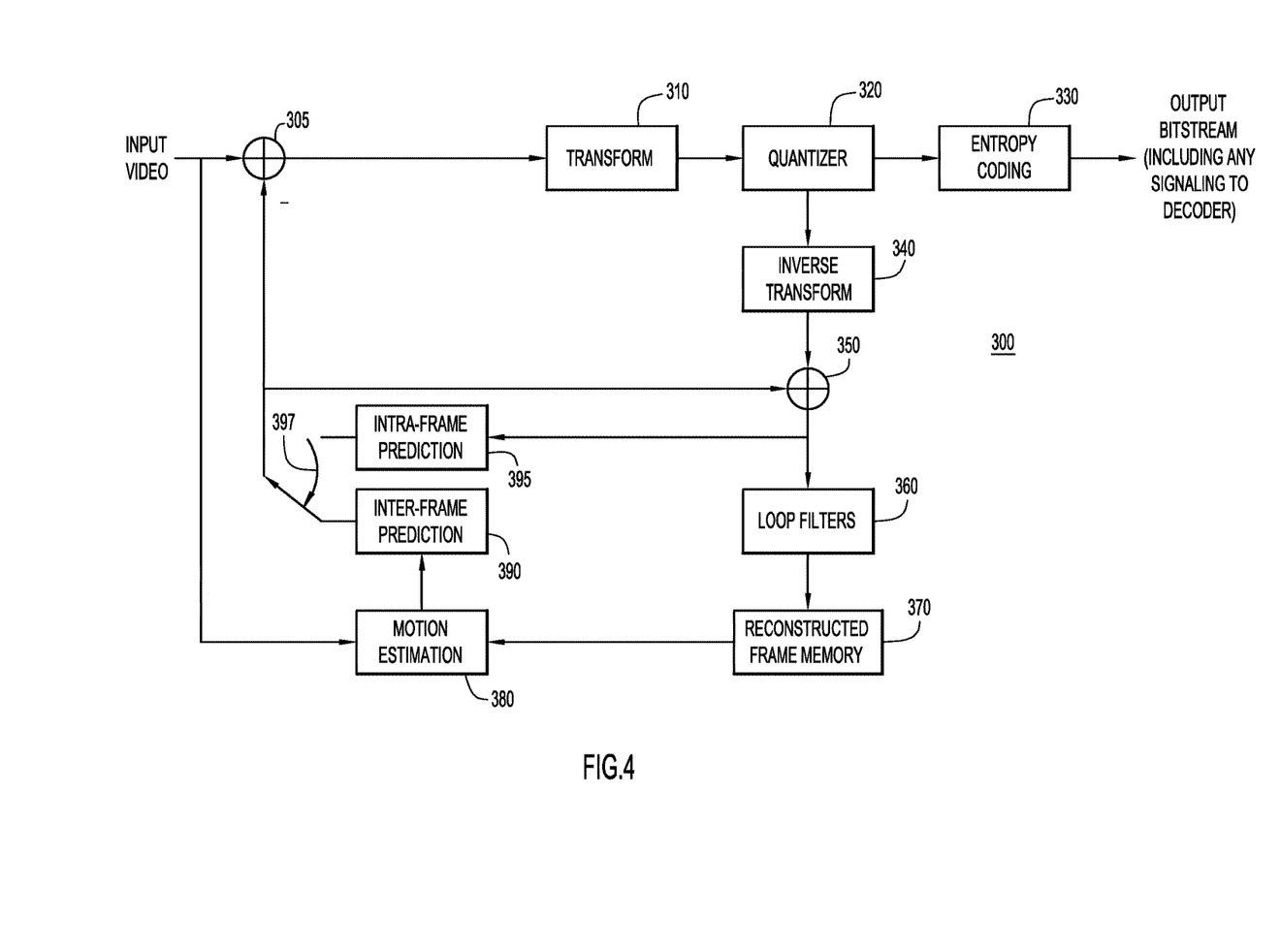
FIG. 4 is a block diagram of a video encoder configured to use the entropy coding techniques presented herein, according to an example embodiment.

Referring first to FIG. 4 a block diagram of a video encoder is shown at reference numeral 300. The video encoder 300 is configured to perform the entropy coding techniques presented herein. The video encoder 300 includes a subtractor 305, a transform unit 310, a quantizer unit 320, an entropy coding unit 330, an inverse transform unit 340, an adder 350, one or more loop filters 360, a reconstructed frame memory 370, a motion estimation unit 380, an inter-frame prediction unit 390, an intra-frame prediction unit 395 and a switch 397.

A current frame (input video) as well as a prediction frame are input to a subtractor 305. The subtractor 305 is provided with input from either the inter-frame prediction unit 390 or intra-frame prediction unit 395, the selection of which is controlled by switch 397. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 380 supplies a motion estimation output as input to the inter-frame prediction unit 390. The motion estimation unit 380 receives as input the input video and an output of the reconstructed frame memory 370.

The subtractor 305 subtracts the output of the switch 397 from the pixels of the current frame, prior to being subjected to a two dimensional transform process by the transform unit 310 to produce transform coefficients. The transform coefficients are then subjected to quantization by quantizer unit 320 and then supplied to entropy coding unit 330. Entropy coding unit 330 applies entropy encoding in order to remove redundancies without losing information, and is referred to as a lossless encoding process. Subsequently, the encoded data is arranged in network packets via a packetizer (not shown), prior to be transmitted in an output bit stream. Moreover, the entropy coding unit 330 may be configured to retain and use entropy coding state of prior frames (or use entropy coding state of spatial neighbors in a current frame) when coding a current video frame, as described above. Signaling to a decoder may be included in the output bitstream as explained above.

The output of the quantizer unit 320 is also applied to the inverse transform unit 340 and used for assisting in prediction processing. The adder 350 adds the output of the inverse transform unit 340 and an output of the switch 397 (either the output of the inter-frame prediction unit 390 or the intra-frame prediction unit 395). The output of the adder 350 is supplied to the input of the intra-frame prediction unit 395 and to one or more loop filters 360 which suppress some of the sharpness in the edges to improve clarity and better support prediction processing. The output of the loop filters 360 is applied to a reconstructed frame memory 370 that holds the processed image pixel data in memory for use in subsequent motion processing by motion estimation block 380.

Figure 5:
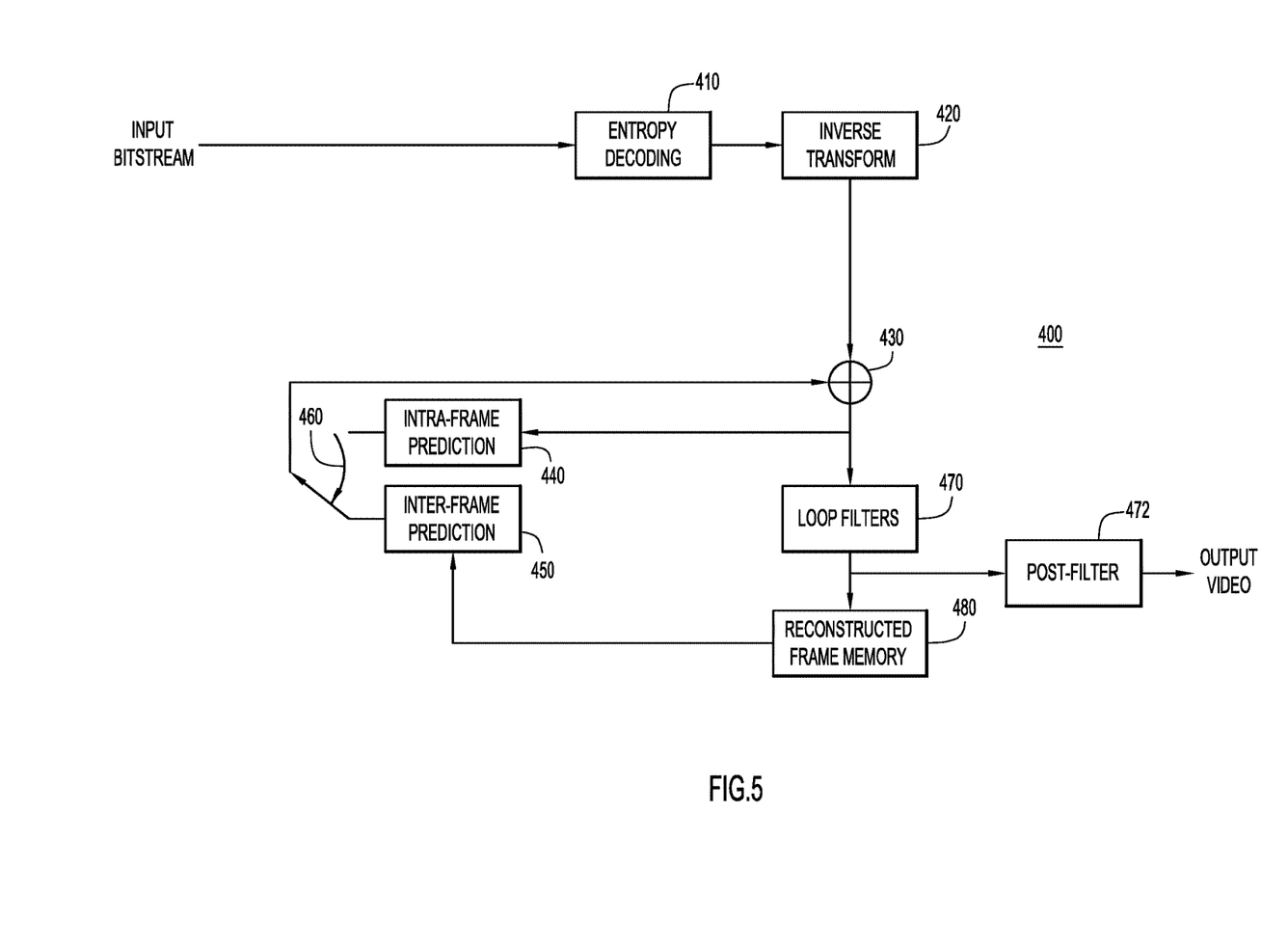
FIG. 5 is a block diagram of a video decoder configured to use entropy coding techniques presented herein, according to an example embodiment.

Turning to FIG. 5, a block diagram of a video decoder is shown at reference numeral 400. The video decoder 400 is configured to perform the generalized filter techniques presented herein. The video decoder 400 includes an entropy decoding unit 410, an inverse transform unit 420, an adder 430, an intra-frame prediction unit 440, an inter-frame prediction unit 450, a switch 460, one or more loop filters 470 and a reconstructed frame memory 480. A post-filter 472 is also shown in FIG. 5.

The entropy decoding unit 40 performs entropy decoding on the received input bitstream to produce quantized transform coefficients which are applied to the inverse transform unit 420. The entropy decoding unit 40 may be configured to operate as described above by using a library that retains entropy coding states of prior video frames. The inverse transform unit 420 applies two-dimensional inverse transformation on the quantized transform coefficients to output a quantized version of the difference samples. The output of the inverse transform unit 420 is applied to the adder 430. The adder 430 adds to the output of the inverse transform unit 420 an output of either the intra-frame prediction unit 440 or inter-frame prediction unit 450. An output video image is taken at the output of the loop filters 470.

The video encoder 300 of FIG. 4 and the video decoder 400 of FIG. 5 may be implemented by digital logic gates in an integrated circuit (e.g., by an application specific integrated circuit) or by two or more separate logic devices. Alternatively, the video encoder 300 and video decoder 400 may be implemented by software executed by one or more processors, as described further in connection with FIG. 6, below.

Each of the functional blocks in FIGS. 4 and 5 are executed for each coding block, prediction block, or transform block. The entropy coding unit 330 shown in FIG. 4 and the entropy decoding unit 410 shown in FIG. 5 each maintain an entropy coding state library (e.g., initialization statistics) for different regions of video frames over a sequence of video frames, to enable selections to be made from the library of initialization statistics which are (most) appropriate for a region of the current video frame (e.g., segment or a tile).

Figure 6:
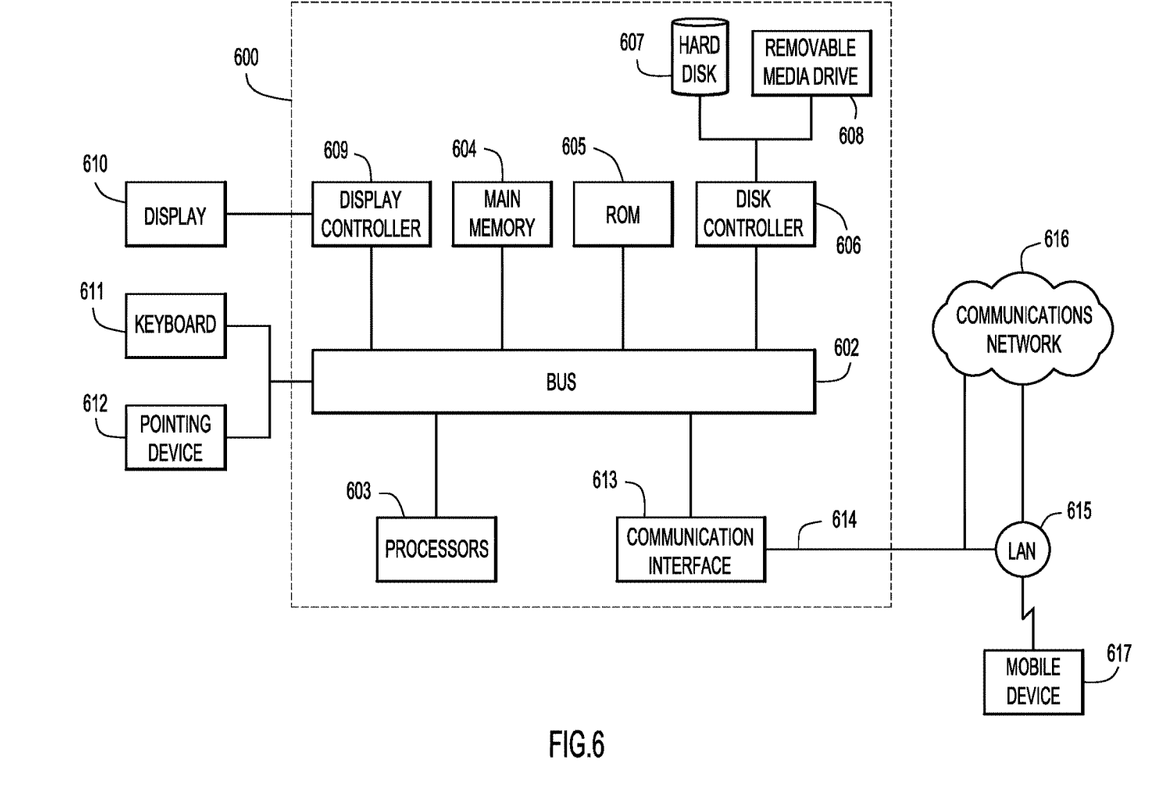
FIG. 6 is a block diagram of a computing system in which the video encoding and/or video decoding operations may be performed, according to an example embodiment.

FIG. 6 illustrates a computer system 600 upon which an embodiment may be implemented. The computer system 600 may be programmed to implement a computer based device, such as a video conferencing endpoint or any device includes a video encoder or decoder for processing real time video images. The computer system 600 includes a bus 602 or other communication mechanism for communicating information, and a processor 603 coupled with the bus 602 for processing the information. While the figure shows a signal block 603 for a processor, it should be understood that the processors 603 represent a plurality of processing cores, each of which can perform separate processing. The computer system 600 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 600 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 600 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 600 using an appropriate device interface (e.g., small computer system interface (SCSI), integrated device electronics (IDE), enhanced-IDE (E-IDE), direct memory access (DMA), or ultra-DMA).

The computer system 600 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 600 may also include a display controller 609 coupled to the bus 602 to control a display 610, such as a cathode ray tube (CRT), liquid crystal display (LCD), light emitting diode (LED) display, or any display technology now known or hereinafter developed, for displaying information to a computer user. The computer system 600 includes input devices, such as a keyboard 611 and a pointing device 66, for interacting with a computer user and providing information to the processor 603. The pointing device 66, for example, may be a mouse, a trackball, or a pointing stick for communicating direction information and command selections to the processor 603 and for controlling cursor movement on the display 610. In addition, a printer may provide printed listings of data stored and/or generated by the computer system 600.

The computer system 600 performs a portion or all of the processing steps in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 600 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 600, for driving a device or devices for implementing the techniques presented herein, and for enabling the computer system 600 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 600 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local are network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 600 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 600 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

As explained above, entropy coding is the efficient expression of the parameters of the video tools used to compress each part of each picture of a coded sequence. The best entropy coding methods adapt to the content they have coded for, and this adaptation can be reset at the boundaries of sub-picture regions (slices, tiles etc.). The embodiments presented herein involve retaining sub-picture entropy coding state from prior pictures (video frames) available to the decoder, building on previous statistical adaptation in sub-picture regions with similar content, rather than resetting to null in every coded region.

This results in more efficient entropy coding of video compression bitstreams by inter-frame re-use of spatially segmented entropy coding contexts and their associated statistical models (adapted by prior exposure to similar picture content and similar coding parametrization). Thus, the entropy coding state of a selected prior video frame may be adjusted based on a difference in parametrization of the current frame relative to the selected prior frame or based on one or more properties of content of the current frame relative to the selected prior frame.

These techniques are useful with any mechanism for spatial picture sub-division that breaks entropy coding dependencies within the current picture, including slices, tiles, and segments. Entropy coding methods as applicable to a set of established contexts are unchanged; only the initialization to use a previously established context is introduced to the entropy coding process. Very little additional information is sent in the encoded bitstream to make use of state achieved in prior frames available at the decoder. As explained above, this can be extended to apply at keyframes, by the transmission of entropy coding state accompanying a coded keyframe.

In summary, in one form, a method is provided comprising: storing entropy coding states for regions of video frames of a sequence of video frames, on completion of coding of those regions; and deriving entropy coding initialization states for regions of a current video frame based on entropy coding states of corresponding regions of a prior video frame in the sequence of video frames.

In another form, an apparatus is provided comprising a communication interface configured to enable communications over a network; a memory; and a processor coupled to the communication interface and the memory, wherein the processor is configured to: store entropy coding states for regions of video frames of a sequence of video frames, on completion of coding of those regions; and derive entropy coding initialization states for regions of a current video frame based on entropy coding states of corresponding regions of a prior video frame in the sequence of video frames.

In still another form, one or more non-transitory computer readable storage media are provided that are encoded with instructions that, when executed by a processor, cause the processor to perform operations comprising: storing entropy coding states for regions of video frames of a sequence of video frames, on completion of coding of those regions; and deriving entropy coding initialization states for regions of a current video frame based on entropy coding states of corresponding regions of a prior video frame in the sequence of video frames.

As described above, individual regions may be defined in order to encompass a specific type of picture content so that regions of different types of picture content are treated differently when deriving entropy coding initialization states. Stored entropy coding states may be updated for regions over time. Thus, when deriving the entropy coding state of the current video frame, a prior video frame is selected from which to use entropy coding state. The entropy coding state of a selected prior video frame may be adjusted based on a difference in parametrization of the current frame relative to the selected prior frame or based on one or more properties of content of the current frame relative to a selected prior frame. When the current video frame has a different segmentation than that of a selected prior video frame, deriving includes combining, with weighting of regions of the selected prior video frame for larger regions in the current video frame, or mapping based on location for smaller regions in the current video frame. In one form, the selection of the prior video frame may be implicit based on values of a set of quantization parameters used to code a video frame and position of a video frame in a frame hierarchy. In another form, the selection may be implicit based on type of coded video frame and position within a group of pictures pattern of frame types, including any frame reference hierarchy.

In still another form, the selection may be based on explicit signaling by an encoder to a decoder of one of a number of possible candidate prior video frames from which to use entropy coding states. Each region of the current video frame may be signaled by an encoder to a decoder with an independently selected prior video frame from which to use entropy coding states. Furthermore, when explicit signaling is made, the deriving is based on signaling, on a region basis from an encoder to a decoder, where the signaling indicates whether to derive entropy coding initialization states based on an entropy coding state of a corresponding region of a prior video frame or based on a default entropy coding model. When signaling is used from an encoder to a decoder, the deriving may based on signaling as to a selection of one or more spatial neighbors or non-adjacent neighbors within a common segment of the current video frame from which to use entropy coding state.

As explained above, data representing the entropy coding model may be included/contained in a keyframe that is transmitted (along with) a keyframe from an encoder to a decoder to provide entropy coding states for regions of the keyframe. Further still, the deriving may be based only on contexts for a prior video frame upon which the current video frame depends for motion compensation purposes.

When motion has occurred in the current video frame relative to a selected prior video frame, deriving includes translating entropy coding states from regions in the selected prior video frame based on sub-frame motion information. The sub-frame motion information may be signaled by an encoder to a decoder.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   storing, in an entropy coding state library, entropy coding states for regions of video frames of a sequence of video frames, on completion of coding of those regions;
   selecting, from the entropy coding state library, the stored entropy coding states for regions of a prior video frame in the sequence of video frames based on a similarity of one or more properties of the prior video frame to properties of a current video frame; and
   based on the stored entropy coding states for the regions of the prior video frame, deriving entropy coding initialization states for corresponding regions of the current video frame.

2. The method of claim 1, further comprising defining individual regions in order to encompass a specific type of picture content so that regions of different types of picture content are treated differently when deriving the entropy coding initialization states.

3. The method of claim 1, further comprising updating the stored entropy coding states for regions over time.

4. The method of claim 1, further comprising adjusting the stored entropy coding states for the regions of the prior video frame based on a difference in parametrization of the current video frame relative to the prior video frame or based on one or more properties of content of the current video frame relative to the prior video frame.

5. The method of claim 1, wherein when the current video frame has a different segmentation than that of the prior video frame, deriving comprises combining with a weighting of regions of the prior video frame for larger regions in the current video frame or mapping based on location for smaller regions in the current video frame.

6. The method of claim 1, wherein when motion has occurred in the current video frame relative to the prior video frame, deriving comprises translating the stored entropy coding states for the regions of the prior video frame based on sub-frame motion information.

7. The method of claim 6, wherein the sub-frame motion information is signaled by an encoder to a decoder.

8. The method of claim 1, wherein selecting the stored entropy coding states is implicit based on values of a set of quantization parameters used to code the prior video frame and a position of the prior video frame in a frame hierarchy.

9. The method of claim 1, wherein selecting the stored entropy coding states is implicit based on a type of coded video frame and a position within a group of pictures pattern of frame types, including any frame reference hierarchy.

10. The method of claim 1, wherein selecting is based on explicit signaling by an encoder to a decoder of one of a number of possible candidate prior video frames from which to use the stored entropy coding states.

11. The method of claim 10, wherein each region of the current video frame is signaled by the encoder to the decoder with an independently selected prior video frame from which to use the stored entropy coding states.

12. The method of claim 10, wherein deriving is based on signaling, on a region basis from the encoder to the decoder, whether to derive the entropy coding initialization states based on the stored entropy coding state for a region of the prior video frame or based on a default entropy coding model.

13. The method of claim 1, wherein deriving is based on an entropy coding model contained in a keyframe that is transmitted from an encoder to a decoder to provide entropy coding states for regions of the keyframe.

14. The method of claim 1, wherein deriving is based on signaling from an encoder to a decoder as to a selection of one or more spatial neighbors or non-adjacent neighbors within a common segment of the current video frame from which to use the stored entropy coding state.

15. The method of claim 1, wherein deriving is based only on contexts for the prior video frame upon which the current video frame depends for motion compensation purposes.

16. An apparatus comprising:
   a communication interface configured to enable communications over a network;
   a memory; and
   a processor coupled to the communication interface and the memory, wherein the processor is configured to:
      store, in an entropy coding state library, entropy coding states for regions of video frames of a sequence of video frames, on completion of coding of those regions;
      select, from the entropy coding state library, the stored entropy coding states for regions of a prior video frame in the sequence of video frames based on a similarity of properties of the prior video frame to one or more properties of a current video frame; and
      based on the stored entropy coding states for the regions of the prior video frame, derive entropy coding initialization states for corresponding regions of the current video frame.

17. The apparatus of claim 16, wherein the processor is further configured to define individual regions in order to encompass a specific type of picture content so that regions of different types of picture content are treated differently when deriving the entropy coding initialization states.

18. One or more non-transitory computer readable storage media encoded with instructions that, when executed by a processor, cause the processor to perform operations comprising:
   storing, in an entropy coding state library, entropy coding states for regions of video frames of a sequence of video frames, on completion of coding of those regions;
   selecting, from the entropy coding state library, the stored entropy coding states for regions of a prior video frame in the sequence of video frames based on a similarity of one or more properties of the prior video frame to properties of a current video frame; and
   based on the stored entropy coding states for the regions of the prior video frame, deriving entropy coding initialization states for corresponding regions of the current video frame.

19. The non-transitory computer readable storage media of claim 18, further comprising instructions operable for defining individual regions in order to encompass a specific type of picture content so that regions of different types of picture content are treated differently when deriving the entropy coding initialization states.

20. The apparatus of claim 16, wherein the processor is further configured to update the stored entropy coding states for regions over time.

\* \* \* \* \*